US008184159B2

(12) United States Patent  
Luo

(10) Patent No.: US 8,184,159 B2  
(45) Date of Patent: May 22, 2012

(54) FORWARD LOOKING SENSOR SYSTEM

(75) Inventor: Yun Luo, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1313 days.

(21) Appl. No.: 11/728,547

(22) Filed: Mar. 26, 2007

(65) Prior Publication Data

US 2008/0239076 A1    Oct. 2, 2008

(51) Int. Cl.  
*H04N 7/18* (2006.01)
(52) U.S. Cl. ........................................... 348/148
(58) Field of Classification Search .................. 348/148  
See application file for complete search history.

(56) References Cited

U.S. PATENT DOCUMENTS

| | | | |
|---|---|---|---|
| 5,790,403 A * | 8/1998 | Nakayama | 701/28 |
| 6,285,393 B1 | 9/2001 | Shimoura et al. | |
| 2003/0191568 A1* | 10/2003 | Breed | 701/36 |
| 2004/0070493 A1* | 4/2004 | Veziris | 340/441 |
| 2006/0034484 A1* | 2/2006 | Bahlmann et al. | 382/103 |
| 2006/0177098 A1* | 8/2006 | Stam | 382/104 |

FOREIGN PATENT DOCUMENTS

EP    1 760 662 A1    3/2007

OTHER PUBLICATIONS

Turk et al., "VITS—A Vision System for Autonomous Land Vehicle Navigation", *IEEE Transactions on Pattern Analysis and Machine Intelligence*, 10:342-361 (1988).
Sun et al., "On-Road Vehicle Detection Using Optical Sensors: A Review" *IEEE Conference in Washington, D.C.*, dated Oct. 3, 2004, pp. 585-590.
European Communication dated Feb. 2, 2012, received in the corresponding European Patent Application No. EP-08742118, filed Mar. 18, 2008, 8 pages.

* cited by examiner

*Primary Examiner* — Ario Etienne  
*Assistant Examiner* — Hee Kim  
(74) *Attorney, Agent, or Firm* — Tarolli, Sundheim, Covell & Tummino LLP

(57) ABSTRACT

Systems and methods are provided for controlling a plurality of vehicle systems. A forward looking sensor (12) is configured to obtain a two-dimensional image of a space in front of the vehicle. A region identification element (14) divides the two-dimensional image into a plurality of regions. Each region represents a portion of the space forward of the vehicle. An image transform (16) transforms the two-dimensional image to a three-dimensional coordinate system representing the space in front of the vehicle to calculate depth information for at least a portion of the image. Each of a plurality of expert systems (18-20) have at least one associated region and control a vehicle system (22-24) according to data from their respective at least one associated region and the calculated depth information.

16 Claims, 4 Drawing Sheets

FORWARD LOOKING SENSOR SYSTEM

TECHNICAL FIELD

The present invention is directed generally to vision systems and is particularly directed to a method and apparatus for utilizing a vision system in a vehicle.

BACKGROUND OF THE INVENTION

Automobile accidents represent a significant concern. As the population and the accompanying number of vehicles on the roads increase, the probability of vehicle accidents increases. These accidents include vehicle-to-vehicle accidents, vehicle-to-object accidents, and vehicle-to-pedestrian accidents. While a number of on-board vehicle safety features has increased over the years, many of these safety features have not been concerned with accident avoidance.

Studies suggest that accidents can result from driver inattention during lane departure or, simply driver error. Systems have been proposed to address these problems. Some systems have included radar, ultrasonic devices, or cameras to obtain surrounding information.

SUMMARY OF THE INVENTION

In accordance with one aspect of the present invention, a vehicle system with a forward looking sensor is provided. The forward looking sensor is configured to obtain a two-dimensional image of a space in front of the vehicle. A region identification element divides the two-dimensional image into a plurality of regions. Each region represents a portion of the space in front of the vehicle. An image transform element transforms the two-dimensional image to a three-dimensional coordinate system representing the space in front of the vehicle to calculate depth or distance information for at least a portion of the image. Each of a plurality of expert systems have at least one associated region and control a vehicle function according to data from their respective at least one associated region and the calculated depth information.

In accordance with another aspect of the invention, a method is provided for controlling vehicle systems. The space in front of a vehicle is imaged to obtain a two-dimensional image. The two-dimensional image is divided into a plurality of regions, with each region representing a portion of the space in front of the vehicle. An image transform element transforms the two-dimensional image into a three dimensional coordinate system representing the space in front of the vehicle is produced to calculate depth information for at least a portion of the image. A first expert system controls a first vehicle function according to image data and calculated depth information from a first region of the plurality of regions. A second expert system controls a second vehicle function according to image data and calculated depth information from a second region of the plurality of regions.

In accordance with yet another aspect of the present invention, a computer readable medium containing computer executable instructions for processing two-dimensional image data from a forward looking sensor within a vehicle is provided. A region identification element divides the two-dimensional image data into a plurality of regions, with each region representing an area in front of the vehicle. An image transform transforms the two-dimensional image to a three dimensional coordinate system representing the space in front of the vehicle to calculate depth information for at least a determined ground plane of the image. Each of a plurality of expert systems has at least one associated region and control a vehicle function according to data from their respective at least one associated region and the calculated depth information.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
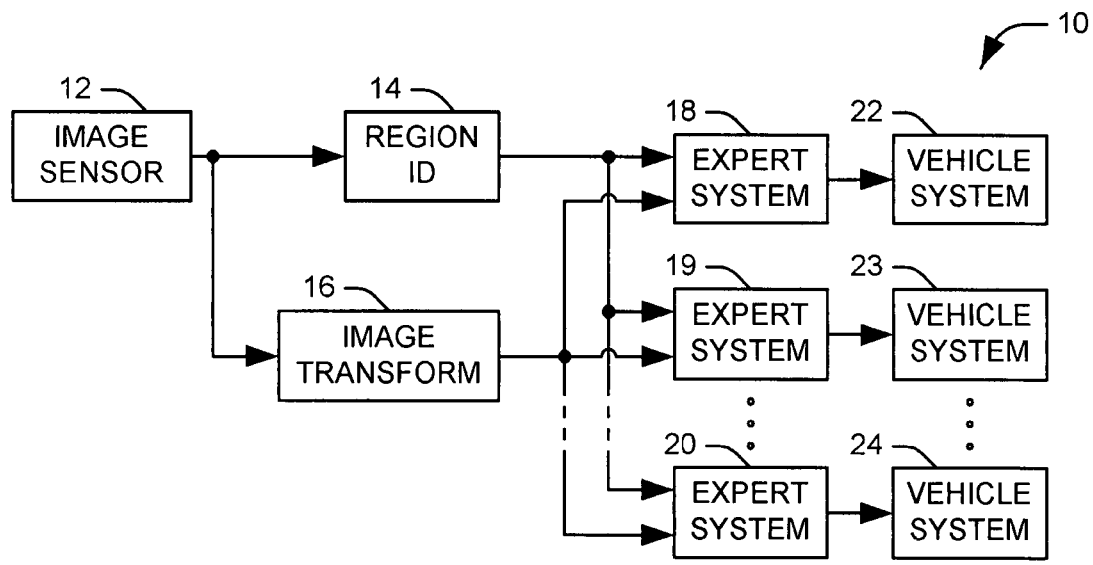
FIG. 1 illustrates a forward looking sensor system in accordance with an aspect of the present invention.

FIG. 1 illustrates a forward looking sensor system 10 in accordance with one example embodiment of the present invention. It will be appreciated that the various elements comprising the system 10 can be implemented as dedicated hardware, as an application specific integrated circuit ("ASIC"), as a software program running on a general purpose processor or microcomputer, or as some combination of hardware and software. Where the system 10 is implemented at least, in part, as a software program, each element within the illustrated image can be read as a set of computer executable instructions, stored on a computer readable medium that can be executed to perform the recited function.

A forward looking sensor 12 is configured to obtain a two-dimensional image of a space or area in front of the vehicle. The forward looking sensor 12 can include any appropriate imaging sensor for producing reasonable high resolution images from a moving platform. A region identification element 14 divides the two-dimensional image into a plurality of regions. In accordance with an aspect of the present invention, each region represents a portion of the space in front of the vehicle. In one implementation, the regions include a sky region, a road region, and a side region which is the portion of the image that is neither in the sky region nor the road region, representing the area to either side of the road. The side region contains regions both above and below the horizon and does not share the uniformity of texture or color within the region. It will be appreciated that a vehicle, obstacle or pedestrian on the road can be extend into either or both of the road region and the side region, and the segmentation of the image be altered to account for such cases. In addition, vehicle and pedestrian detection systems can will be configured to search for candidates in both regions.

In one implementation, the region identification element 14 operates by locating subregions within the image, representing homogenous regions of a desired image characteristic (e.g., hue, intensity, texture, saturation). These regions can then be clustered together via a clustering algorithm to form larger regions having similar characteristics. Data from other vehicle systems can be utilized to guide the clustering analysis, including lane and road boundaries obtained from a lane departure notification system and the image horizon, which can be determined from the vanishing point of the road boundaries.

An image transform 16 transforms the two-dimensional image to a three-dimensional coordinate system representing the space in front of the vehicle. The effective of this transform is to calculate depth information for at least a portion of the image, generally the ground plane of the image. Since most objects will intersect or at least approach the ground plane at some point, this data can be used to determine associated distance for objects detected within the image.

The determined regions and the calculated depth information are provided to a plurality of expect systems 18-20. In accordance with an aspect of the present invention, each expert system evaluates data from at least one associated region to control an associated vehicle system 22-24. The evaluated data can include both the image data from the region and the calculated depth data. In general, the associated vehicle functions relate to the safety of the occupants and other individuals. For example, the systems 22-24 can include traction control and fog lamp or head light control, as well as alarms that can be triggered by recognition of a pedestrian or a vehicle within a threshold distance.

The expert systems 18-20 can include any of a number of known algorithms for evaluating complex data including statistical classifiers, support vector machines, clustering algorithms, neural networks, fuzzy logic systems, rule-based decision systems, and Bayesian and Dempster-Shafer decision trees, as well as algorithms utilized in conjunction with these decision algorithms, such as feature extraction algorithms and image processing tools. As a result, data from the image sensor 12 can be efficiently obtained and processed to modify the behavior of one or more vehicle system in response to events of interest within the space in front of the vehicle.

Figure 2:
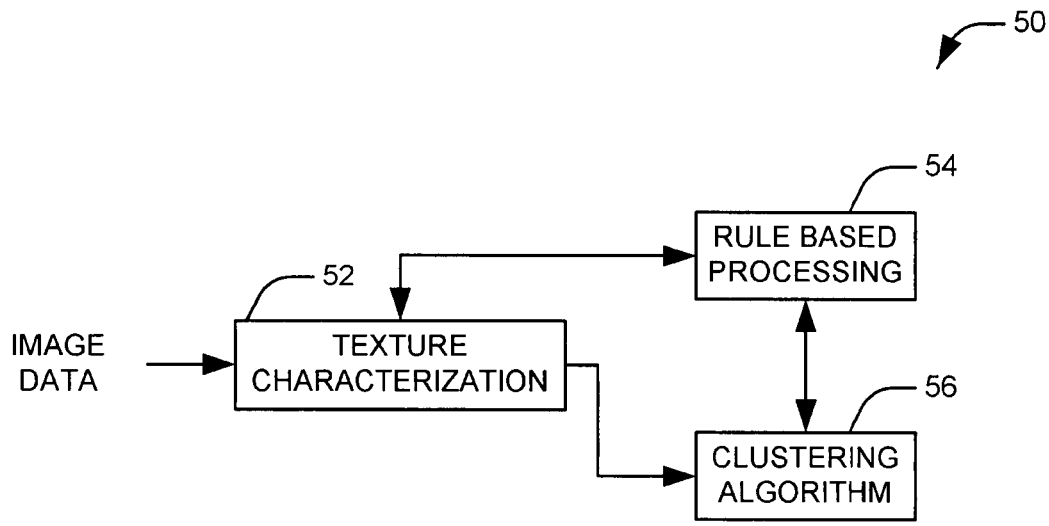
FIG. 2 illustrates an example of a region identification element for segmenting an input image into a plurality of regions in accordance with an aspect of the present invention.

FIG. 2 illustrates an example of a region identification element 50 for segmenting an input image into a plurality of regions in accordance with an aspect of the present invention. In the illustrated example, three regions of interest are identified: a sky region, a road region, and a side region representing objects along the side of the road. A rule based processing component 52 regulates the process according to information available from other vehicle systems. For example, when the location of the road is known from other vehicle systems with high confidence, a road region can be defined without recourse to other data. Similarly, the location of road boundaries and a horizon line within the image can be used in determining the location of each region.

In conjunction with the rule-based analysis, a texture characterization component 54 locates subregions of homogenous texture within the image. The characterization can be extended to other visual cues such as color (e.g., hue, brightness, and/or saturation) for a color vision system. This can be accomplished by any appropriate algorithm, for example, a gradient search algorithm that locates abrupt changes in contrast or color. Subregions having similar textures can be grouped together by a clustering component 56 to form complete regions. A number of suitable clustering algorithms are known in the art, such as k-means clustering, QT-clustering, and Kohonen maps. General characteristics of the textures associated with each region can be predetermined during a training stage, such that once a plurality of regions have been generated by the clustering algorithm, each region can be identified by the textures comprising the region.

Figure 3:
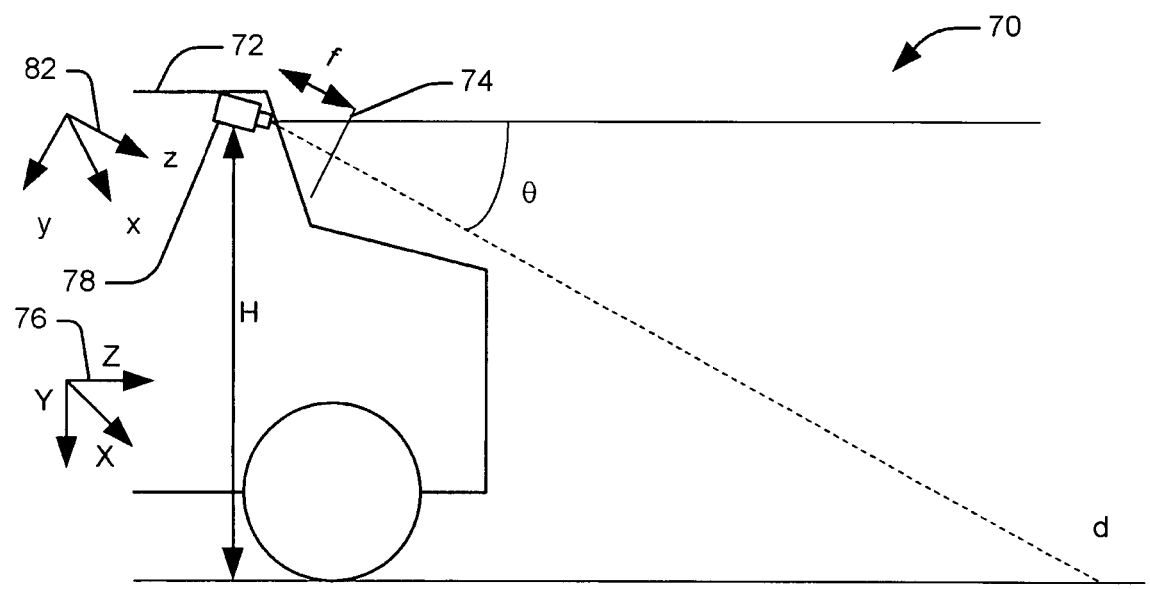
FIG. 3 illustrates from a side view perspective an example of a forward looking imaging system in accordance with an aspect of the present invention.

FIG. 3 illustrates from a side view perspective an example of a forward looking imaging system 70 in accordance with an aspect of the present invention for a vehicle 72 utilizing a transform of image data from a two-dimensional image plane 74 to a three-dimensional world coordinate system 76 representing the space in front of the vehicle 72, as a horizontal Z-axis oriented along a longitudinal axis of the vehicle, a vertically oriented Y-axis, and a horizontal X-axis oriented perpendicular to the Y-axis and the Z-axis. Through use of this transform, the distance of objects viewed in the image plane 74 from the vehicle, specifically along the Z-axis, can be determined. To this end, a camera 78 mounted on or within the vehicle is configured to image a space in front of the vehicle. In the illustrated example, the camera is angled downward toward a ground plane 80 by a predetermined pitch angle, $\theta$.

The image captured at the camera is analyzed to determine the distance of objects within the image from the vehicle. To this end, the two-dimensional image plane is translated to a three-dimensional camera coordinate system 82, with the x-axis and y-axis of the camera coordinate system 82 representing vertical and horizontal axes, respectively, within the image plane 74. A z-axis extends along the field of view of the camera, normal to the image plane 74. Because of the pitch of the camera and its location within the vehicle, the camera coordinate system 82 is slightly rotated around the X-axis and translated vertically a distance equal to the height, H, of the camera from the ground vertically relative to the world coordinate system 76.

To simplify the transformation of the image into the camera coordinates, it is helpful to assume that the ground plane 80 is a flat surface. For a camera 78 having pixels of width $w_u$, height $w_v$, and a focal length of f, the relationship between camera coordinates (x, y, z) and image coordinates (u, v) can be expressed as:

$$u = u_0 + \frac{f*x}{w_u*z} \qquad \text{Eq. 1}$$

$$v = v_0 + \frac{f*y}{w_v*z} \qquad \text{Eq. 2}$$

where $(u_0, v_0)$, represents a center point of the image plane.

A horizon line, $v_h$, within the image plane can be determined from the characteristics of the camera as described above and the known pitch angle, $\theta$, of the camera as:

$$v_h = v_0 - \frac{f\tan(\theta)}{w_v} \qquad \text{Eq. 3}$$

From Eq. 2 above, Eq. 3 can be rewritten as:

$$\frac{(v-v_h)w_v}{f} = \frac{y}{z} + \tan(\theta) \qquad \text{Eq. 4}$$

Since the camera coordinate system 82 represents the world coordinate system 76 with a rotation around the X-axis equal to the pitch angle, $\theta$, and a translation along the Y-axis equal to the camera height, H, the translation between the camera coordinates and the world coordinates can be represented as X=x, Y=y[cos($\theta$)]−H, and Z=z[cos($\theta$)]. Accordingly, from Eq. 4 above, the distance, d, between a given point on the ground plane (X, Y=0, Z=d) and the vehicle can be expressed as:

$$\begin{cases} d = \dfrac{fH}{w_v v - w_v v_h - f\tan(\theta)} & \text{if } v > v_h \\ \quad \infty & \text{if } v \le v_h \end{cases} \quad \text{Eq. 5}$$

In practice, to determine the distance to a given object within the image, the intersection of the object with the ground plane can be determined, and the vertical location of the intersection within the image can be utilized to calculate the distance, d, to the object. Accordingly, the distance of various objects within the field of view of the camera can be determined without the use of additional sensors, significantly reducing the cost of the system 70.

Figure 4:
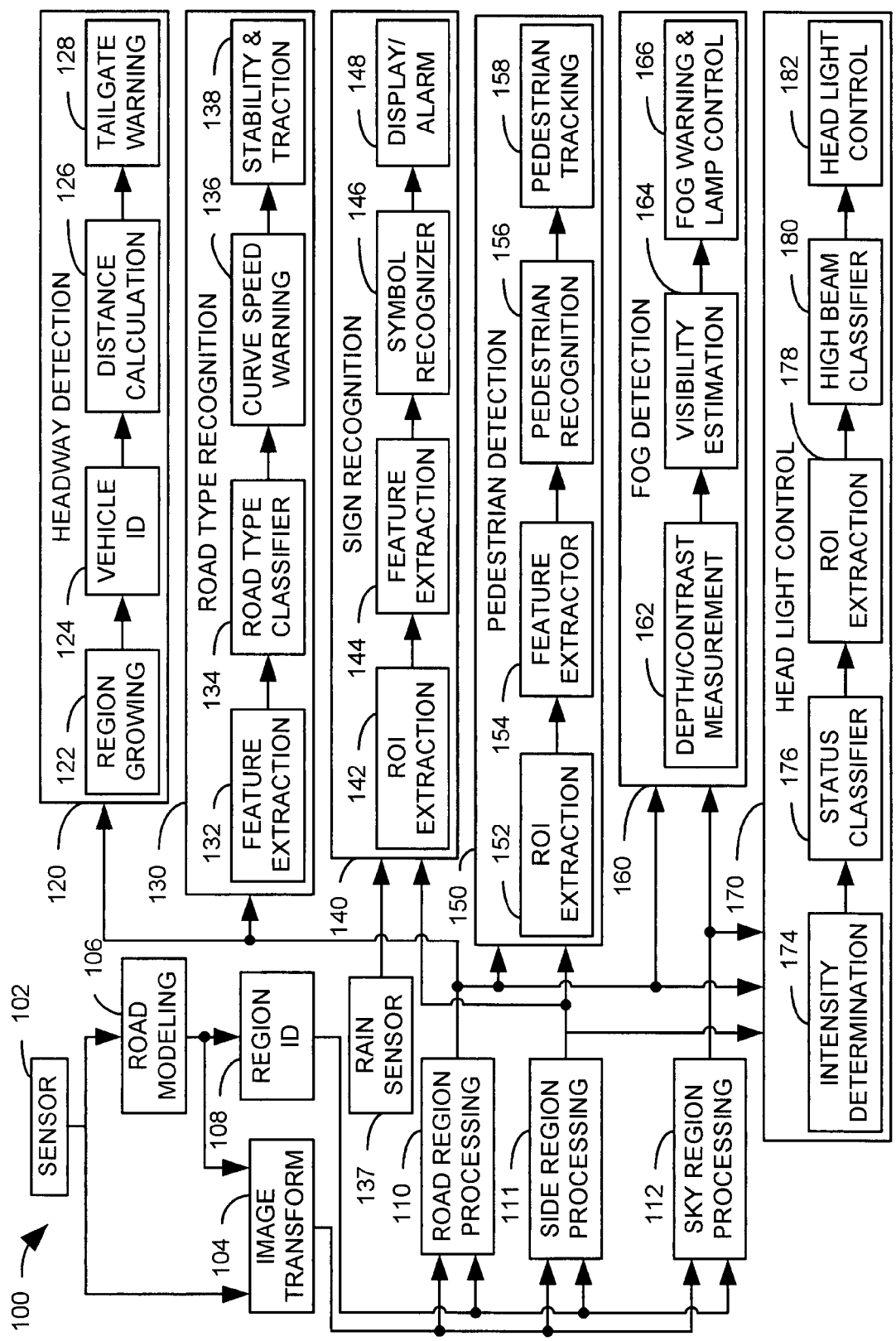
FIG. 4 illustrates one implementation of forward looking sensor system presented as an example in accordance with an aspect of the present invention.

FIG. 4 illustrates one implementation of forward looking sensor system 100 presented as an example in accordance with an aspect of the present invention. A two-dimensional image from a forward looking sensor 102 is provided to each of an image transform component 104 and a road modeling component 106. The image transform component 104 maps the two-dimensional image into a three-dimensional set of world coordinates to produce depth information for the image. Accordingly, the distance from any given object, specifically the portions of objects along the ground plane of the image, can be calculated from its position within the two dimensional image.

The road modeling component 106 determines the location and geometry of the road within the two-dimensional image. When appropriate data is available, the road modeling component 106 can identify lane markings, edge lines, and pavement boundaries, and define the position of the road from these indicators. Where these indicators are not present or are masked by adverse road conditions, the road modeling component 106 can utilize a default road geometry to designate a portion of the image as representing the road. The default lane geometry utilizes the assumptions of a straight, level road, a vehicle centered within the lane, and a lane width equal to that standard for a road having a speed limit consistent with the speed of the vehicle. In the illustrated example, the road modeling component 106 can be utilized as part of a lane departure warning system, with the road model exported for use in region identification.

The road model produced by the road modeling component 106 is provided to a region identification component 108. The region identification component 108 divides the two-dimensional sensor image into a plurality of regions according to the three-dimensional mapping and the determined road model. In the illustrated example, three regions of interest are identified: a sky region, a road region, and a side region representing objects along the side of the road.

For example, a texture-based analysis can be performed across the image to determine which portions of the image have textures characteristic of a given region. To assist this analysis, a horizon line, determined during formulation of the road model, can be utilized to separate the sky region from the road region, as no portion of the sky region should be located beneath the horizon line and no portion of the road region should be located above the horizon line. The boundaries of the road can further be confirmed by the road model, with the regions outside the road below the horizon line or regions having a texture that does not match the expected texture of the sky or the road can be classified as part of the side region. The identified regions can be labeled as such for further analysis.

Once the regions of the image have been identified, the region labeled image data and the distance data produced at the image transform component 104 can be provided to respective image processing components 110-112 for the three regions. Each of the image processing components 110-112 can subject the image to one or more preprocessing techniques to enhance features of the image within its associated region. It will be appreciated that multiple processing techniques can be utilized one a given region of image data for optimal use of the image by multiple vehicle systems utilizing data from the region. For example, the road image processor 110 could produce a first representation of the data within the road region for a first vehicle system and a second representation of the data within the road region for a second vehicle system.

The processed image data is then provided to a plurality of vehicle system controllers 120, 130, 140, 150, 160, 170. Each of the vehicle system controllers utilizes data from one or more of the regions in making control decisions for its associated vehicle function. It will be appreciated that each of the vehicle system controllers can comprise a microcomputer, discrete circuitry, an application-specific-integrated-circuit ("ASIC"), or any similar processing means.

A headway detection system 120 utilizes data from the road region of the image to determine the distance of objects within the roadway, such as a preceding vehicle, from the vehicle and warns the driver of the vehicle if the distance falls below a desired value. A region growing element 122 searches the roadway ahead to the vehicle for sharp changes in the texture of the roadway. When such a change is found, it can be assumed to be another vehicle blocking the roadway. A line representing a maximum change in texture can be determined to represent the bottom of the detected vehicle.

To minimize false alarms, the detected region can be provided to a vehicle identification element 124 that determines if the region represents a vehicle based on the appearance of the region. The vehicle identification element 124 can comprise one or more classifiers trained for identifying between vehicles and non-vehicle objects. The one or more classifiers can utilize any of a number of classification techniques, including statistical classification, neural networks, support vector machines, rule based processing, and Gaussian mixture models or a cascade of weak classifiers called AdaBoost algorithm. If the change in texture is determined to represent a vehicle, a distance calculation element 126 can determine a distance to the object from the determined vehicle bottom and the depth image provided by the image transform 104. A tailgate warning control 128 can activate a visible or audible alarm when this distance falls below a threshold value. It will be appreciated that this threshold can be static or vary within one or more parameters, such as vehicle speed or determined road conditions.

A road type recognition system 130 is operative to recognize road types and conditions from extracted features of the road region of the image. A feature extraction component 132 evaluates one or more features within the image that are useful in distinguishing among various road types and extracts numerical feature values representing the features from the image. Useful features can include contrast intensity, color, and texture of all or portions the road region as well as the shape of the road. The presence or absence of lane markers can also be utilized as a feature.

Once a number of features have been extracted, the extracted feature values can be provided to a road type classifier 134. The road type classifier 134 classifies the road into one of a plurality of output classes representing various road types. For example, the road types could include, among other examples, paved roads, dirt roads, snow-covered roads, and gravel surfaces. The road type classifier can utilize any of a number of classification techniques, including statistical classification, neural networks, support vector machines, rule based processing, and Gaussian mixture models.

The extracted features can also be provided to a dynamic curve speed warning system 136. The curve warning system uses GPS positioning and stored maps along with input from the image sensor 106 to estimate the curvature of oncoming curves. From this curvature, the extracted features, and input from a rain sensor 137, a safe speed for the curve can be determined, and an alarm can be activated if the vehicle is exceeding this speed.

The safe curve speed can be calculated as:

$$v_s = \sqrt{A_s R} \qquad \text{Eq. 6}$$

where $A_s$ is the limit lateral acceleration on a curve segment and R is the minimum curvature.

The dynamic curve speed warning system 136 can estimate the curvature R by combining information from multiple systems, for example, the curvature can be determined as $R' = \min(R_1, R_2)$, where $R_1$ is the detected curvature from the on-board vision system and $R_2$ is the retrieved curvature from the database. If an obstacle is detected at the headway detection system 120, the curve speed warning is overridden by an obstacle detection warning. If different environment conditions are detected, (e.g., it is raining or the road is wet), the dynamic limited lateral acceleration can be calculated: $A' = rA_s$, where r is the normalized rain intensity between $r=1.0$ when there is no rain and $r<1.0$ when it is raining. A maximum safe speed, above which the driver will be warned of the oncoming curve, can then be calculated as $$v_s = \sqrt{A'R'} \qquad \text{Eq. 7}$$

Once the road type and maximum safe speed have been determined, they can be provided to a stability and traction control system 138 for use in modifying the operation of the vehicle in light of the detected conditions.

A sign recognition system 140 can evaluate information from the side region to notify the driver of signs along the path of travel. A region of interest (ROI) extractor 142 locates sign candidates within the side region. Road signs tend to have distinctive colors, such as red and yellow, and distinctive shapes, generally simple geometric figures such as circles, rectangles, and diamonds, allowing the candidates to be located as regular geometric areas of uniform color and intensity. For example, a candidate sign can be located by searching for these distinctive shapes using blob algorithms and color cues for template matching and/or area correlation.

A feature extraction component 144 extracts a plurality of features from a region of the image corresponding to a given sign candidate that are useful for distinguishing among the various possible signs. For example, the features can include numerical parameters describing the shape of the sign, the color of the sign, the size of the sign, and similar characteristics of any characters or symbols on the sign. The content of the sign can be determined based on known character and symbol recognition methodologies, such as those used in Optical Character Recognition (OCR) systems. The extracted features are then provided to a sign recognizer 146 that identifies the type of sign from the provided features. For example, the sign recognizer 146 can use appropriate recognition algorithms to match a sign type to the extracted features. Once the type of sign has been determined, a display 148 can be updated to notify the driver of the sign and its contents.

A pedestrian recognition system 150 can evaluate information from the side region, which is separated from the road and sky region, and the road region, to notify the driver of pedestrians near the path of travel. A region of interest (ROI) extractor 152 locates pedestrian candidates within the side region. Pedestrian candidates can be identified according to their texture, shape, and motion characteristics. Identified candidates can then be grouped together to provide a candidate of appropriate size, as pedestrians will generally consist of regions of differing color and texture. When a candidate pedestrian is located, that portion of the image is segmented and provided to a feature extraction component 154. The feature extraction component 154 extracts a plurality of appearance based features from the sign that are useful for distinguishing among the various possible signs. For example, the features can include numerical parameters describing the color, shape, texture, and motion of the candidate as a whole and any joined portions of the candidate.

The extracted features are then provided to a candidate classifier 156 that determines if the candidate is a pedestrian from the provided features. The pedestrian classifier 156 can utilize any of a number of classification techniques, including statistical classification, neural networks, support vector machines, rule based processing, and Gaussian mixture models, or a cascade of weak classifiers based on AdaBoost. When a pedestrian is located, the location of the pedestrian can be tracked at pedestrian tracking component 158. The presence of the pedestrian can be indicated to a driver via a display or an audible alarm if the pedestrian is within a threshold distance of the vehicle.

A fog lamp detection system 160 utilizes data from the road region and the sky region to detect low visibility conditions due to fog and adjusts the fog lamps on the vehicle accordingly. A contrast measurement component 162 can measure the contrast of the image at a number of locations and a number of distances along the ground plane. For example, the contrast between line markers and the road can be utilized for these measurements. Since the attenuation ratio of the two contrast values are of interest for this application, the contrast at a distance, d, can be determined as:

$$C_d = \frac{I_{lane} - I_{road}}{I_{lane} + I_{road}} \qquad \text{Eq. 6}$$

wherein $I_{lane}$ is the intensity value of a lane marker at a distance d, and $I_{road}$ is the intensity of the road. These intensity values can be normalized by scale and then averaged over several measurements to produce a robust result.

These contrast values are then provided to a visibility estimation component 164 that determines the visibility for the driver from the determined contrast values. The attenuation of visible contrast due to atmospheric conditions can be estimated as:

$$C = C_0 e^{-kd} \qquad \text{Eq. 7}$$

where $C_0$ is the intrinsic contrast of an object, C is the apparent contrast of the object at a distance, d, and k is a constant.

Assuming a uniform road texture for measurements to be taken, the value of k can be determined from the measurements taken at the contrast measurement component as:

$$k = \frac{\ln\left(\frac{C_1}{C_2}\right)}{d_2 - d_1} \quad \text{Eq. 8}$$

where $C_1$ is the contrast at a distance $d_1$ and $C_2$ is the contrast at a distance $d_2$.

According to the International Commission on Illumination (CIE) standards, the contrast threshold for differentiation is equal to 0.05, and the maximum distance of visibility, V, can be derived from k as:

$$V = \frac{-1}{k}\ln(0.05) \approx \frac{3}{k} = \frac{3(d_2 - d_1)}{\ln\left(\frac{I_{lane(d_1)} - I_{road(d_1)}}{I_{lane(d_2)} - I_{road(d_2)}}\right)} \quad \text{Eq. 9}$$

The determined visibility can then be provided to a fog warning and fog lamp control 166 that can activate fog lamps in response to detected fog and alert an occupant of the foggy conditions.

A head light control element 170 receives data from all three regions to determine an appropriate status for the head lights of the vehicle. An intensity determination 174 samples intensity values from throughout the image. For example, an n×n grid can be overlaid across the image and intensity values can be determined for each block in the grid. The individual grid blocks can be weighted to reflect the relative discrimination value of intensity values from each portion of the image. To remove bias, the intensity values will be adjusted for the gain, exposure, and response curve of the camera, such that a feature value, v, can be determined for each intensity measurement, I, as:

$$v = f^{-1}\left(\frac{I}{g \cdot e}\right) \cdot w_I \quad \text{Eq. 10}$$

where g is the camera gain, e is the camera exposure, f is the camera response curve, and $w_I$ is the weight associated with the block in the grid in which the intensity measurement, I, was taken.

The adjusted intensity values can then be provided to a head light status classifier 176 that determines if the head lights should be on for a given set of conditions. Other inputs can also be provided to the status classifier 176 as features, for example, the output of the rain sensor 138. In practice, the status classifier 176 can be trained on a variety of situations in which it is desirable for the head lights to be activated and a number of situations in which it is unnecessary to activate the head lights until a desired level of discrimination is achieved. The status classifier 176 can utilize any of a number of classification techniques, including statistical classification, neural networks, support vector machines, rule based processing, and Gaussian mixture models.

If the head lights are active, further analysis can be performed to determine if the high beams should be activated. To this end, a region of interest extractor 178 can search for candidate objects within the image that may indicate other vehicles traffic. In conditions of low ambient light, light sources, such as head lights of oncoming vehicles, tail lights of the preceding vehicle, and road lights will resemble high intensity, circular or elliptical blobs. When candidate objects are located, they can be evaluated to determine if they have an appropriate size, shape, and aspect ratio, and discarded if they fall outside of acceptable ranges.

Those objects remaining are evaluated to produce features for a high beam classifier 180. For example, the height and distance of each blob, the distance of the blob from the vehicle, the relationships among blobs, and the overall light histogram of the image can be used to generate appropriate features. The high beam classifier 180 conducts a scene analysis based on these features to determine the probability that the image depicts an oncoming vehicle. The high beam classifier 180 can be trained on a variety of situations in which it is desirable for the high beams to be activated (e.g., no oncoming traffic or distant oncoming traffic) and a number of situations in which it is undesirable to activate the head lights (e.g., proximate oncoming traffic) until a desired level of discrimination is achieved. The high beam classifier 180 can utilize any of a number of classification techniques, including statistical classification, neural networks, support vector machines, rule based processing, and Gaussian mixture models. The determinations of the status classifier 176 and the high beam classifier 180 can be provided to a head light control 182 to regulate the operation of the head lights.

Figure 5:
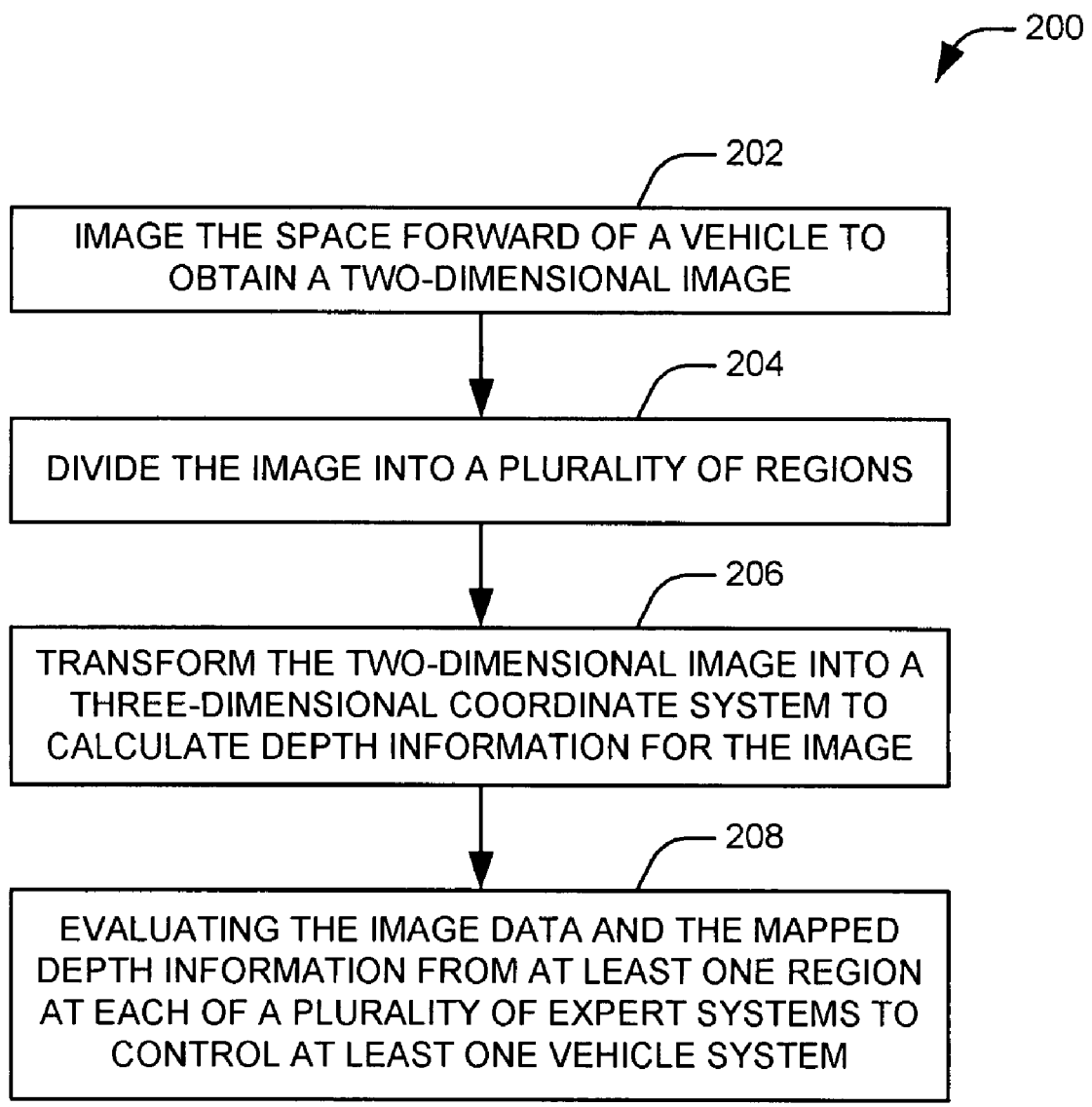
FIG. 5 illustrates a method for controlling a plurality of vehicle systems according to image data from a forward looking sensor in accordance with an aspect of the present invention.

In view of the foregoing structural and functional features described above, methodologies in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a method 200 for controlling a plurality of vehicle systems according to image data from a forward looking sensor in accordance with an aspect of the present invention. At step 202, the space in front of a vehicle is imaged to obtain a two-dimensional image. In one implementation, one or more preprocessing techniques can be applied to the image at this step to accentuate desired features and textures within the image. At step 204, the two-dimensional image is divided into a plurality of regions, with each region representing a portion of the space in front of the vehicle. In one implementation, this division can be performed by dividing the image into a plurality of subregions of homogenous textures. Spatially proximate subregions having similar textures can be clustered together to form regions. This clustering process can be guided by additional information taken from the image, such as the position of the road and various lane markers within the image and the location of the horizon line. For example, the clustering process may penalize clusters that cross a road boundary or the horizon line. In some applications, the clustering process can be executed separately on opposite sides of such a boundary to entirely prevent clusters from crossing boundary lines.

At step 206, the two-dimensional image is transformed into a three-dimensional coordinate system to calculate depth information for the image. In one example, depth information is mapped to the ground plane of the image, such that the distance to a given object within the image can be determined by determining the intersection of the object with the ground plane and determining the vertical position of the intersection within the image. At step 208, each of a plurality of expert systems evaluates the image data and the mapped depth information from at least one region to control at least one vehicle system. Each of the plurality of expert systems has at least one associated region from which it receives data, based upon the image features useful for the system. For example, a road region of the image can be associated with an expert system that controls a traction control system, while a sky region of the image might be useful in determining whether head lights are needed.

Figure 6:
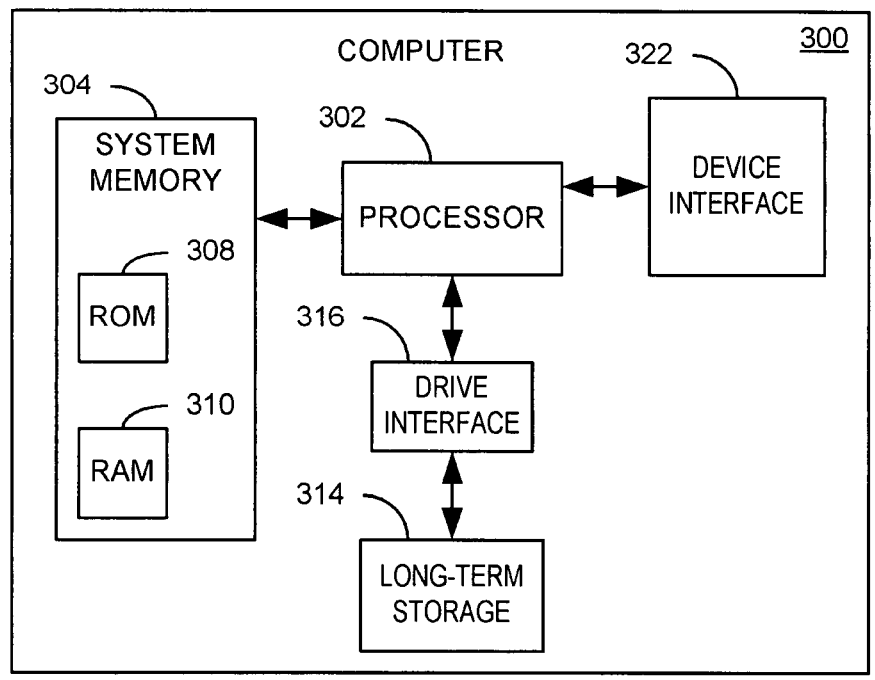
FIG. 6 illustrates a computer system that can be employed to implement systems and methods described herein, such as based on computer executable instructions running on the computer system.

FIG. 6 illustrates a computer system 300 that can be employed as part of a forward looking sensor system to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

Other vehicle systems can communicate with the computer system via a device interface 322. For example, one or more devices and sensors can be connected to the system bus 306 by one or more of a parallel port, a serial port, or a universal serial bus (USB).

From the above description of the invention, those skilled in the art will perceive improvements, changes, and modifications. Such improvements, changes, and modifications within the skill of the art are intended to be covered by the appended claims.

Having described the invention, the following is claimed:

1. A forward looking vision system for a vehicle, comprising:
   a forward looking sensor configured to obtain a two-dimensional image of a space in front of the vehicle;
   a region identification element that divides the two-dimensional image into a plurality of regions, each region representing a portion of the space in front of the vehicle, the region identification element comprising;
   a sub-region location element that determines a plurality of subregions having homogenous characteristics within the two-dimensional image; and
   a clustering element that performs a clustering analysis to combine spatially proximate subregions having similar characteristics to form the plurality of regions;
   an image transform element that transforms the two-dimensional image to a three-dimensional coordinate system representing the space in front of the vehicle to calculate depth information for at least a portion of the image; and
   a plurality of expert systems, each expert system having at least one associated region and each region having at least one associated expert system, that control respective vehicle functions according to data from their respective associated at least one associated regions and the calculated depth information
   wherein the region identification element is operative to process sub-regions above a horizon line of the two-dimensional image separately from sub-regions beneath the horizon line such that the clustering element performs separate clustering analyses for the area above the horizon line to detect a sky region and the area below the horizon line to detect a road region, with any portion of the image not included in the sky region and road region combined into a side region.

2. The system of claim 1, further comprising a road modeling component that determines the location and geometry of a road within the two dimensional image, the region identification element using the determined road location in determining at least one of the plurality of regions.

3. The system of claim 1, the region identification element dividing the image into a road region, representing a roadway in front of the vehicle, a sky region, representing the sky, and a side region, representing objects at the side of the roadway.

4. The system of claim 3, the plurality of expert systems comprising a headway detection system that utilizes data from the road region and side region of the image to determine the distance of objects within the roadway from the vehicle.

5. The system of claim 3, the plurality of expert systems comprising a road type recognition system that is operative to recognize road types and conditions from features extracted from the road region of the image.

6. The system of claim 3, the plurality of expert systems comprising a pedestrian recognition system that is operative to evaluate image data from the side region to notify a driver of pedestrians near the path of travel.

7. The system of claim 3, the plurality of expert systems comprising a fog lamp detection system that utilizes image data from the road region and the sky region to detect low visibility conditions due to fog and adjusts fog lamps on the vehicle accordingly.

8. The system of claim 3, the plurality of expert systems comprising a sign recognition system that can evaluate image data from the side region to notify a driver of signs along the path of travel.

9. The system of claim 3, the plurality of expert systems comprising a dynamic curve speed warning system that is operative to adaptively calculate the curvatures and limited lateral acceleration of the road from image data from the road region and data from at least one other sensor.

10. The system of claim 1, the plurality of expert systems comprising a head light status classifier that evaluates the two-dimensional image to determine if it is appropriate to activate head lights on the vehicle.

11. The system of claim 1, the plurality of expert systems comprising a high beam status classifier that evaluates the two-dimensional image to detect at least one of headlights from oncoming vehicles, taillights from preceding vehicles, and other lights within the two-dimensional image to determine if it is appropriate to activate high beams on the vehicle.

12. A method for controlling vehicle systems, comprising:
   imaging the space in front of a vehicle to obtain a two-dimensional image;
   dividing the two-dimensional image into sky, road, and side regions, each region representing a portion of the space in front of the vehicle, wherein dividing the two-dimensional image comprises:
      locating a horizon line within the two-dimensional image;
      determining a plurality of subregions having homogenous characteristics within the two-dimensional image;
      performing a first clustering analysis on subregions above the horizon line to combine spatially proximate subregions having similar characteristics to form the sky region; and
      performing a second clustering analysis on subregions below the horizon line to combine spatially proximate subregions having similar characteristics to form the road and side regions;
   producing an image transform of the two-dimensional image into a three-dimensional coordinate system representing the space forward of the vehicle to calculate depth information for at least a portion of the image;
   controlling a first vehicle function with a first expert system that utilizes image data and calculated depth information from a first region of the plurality of regions; and
   controlling a second vehicle function with a second expert system that utilizes image data and calculated depth information from a second region of the plurality of regions.

13. The method of claim 12, wherein producing an image transform of the two-dimensional image comprises determining depth information along a ground plane of an image, and controlling a first expert system comprises:
   locating an object within the first region of the two-dimensional image;
   determining an intersection of the object with the ground plane; and
   determining a distance for the object according to the vertical position of the determined intersection within the image.

14. The method of claim 12, wherein dividing the two-dimensional image further comprises:
   locating a road boundary within the two-dimensional image;
   and
   determining at least one region from the located road boundary and the located horizon line.

15. A non-transitory computer readable medium, containing computer executable instructions for processing two-dimensional image data from a forward looking sensor within a vehicle, comprising:
   a region identification element that divides the two-dimensional image data into a plurality of regions, with each region representing an area in front of the vehicle, the region identification element comprising:
      a texture classification element that determines a plurality of subregions having homogenous characteristics within the two-dimensional image data; and
      a clustering element that performs a first clustering analysis to combine spatially proximate subregions having similar characteristics above a horizon line to form a sky region and a second clustering analysis to combine spatially proximate subregions having similar characteristics below the horizon line to form a road and side regions;
   an image transform that transforms the two-dimensional image to a three-dimensional coordinate system representing the space forward of the vehicle to calculate depth information for at least a determined ground plane of the image; and
   a plurality of expert systems, each expert system having at least one associated region and each region having at least one associated expert system, that control respective vehicle functions according to data from their respective associated at least one associated regions and the calculated depth information.

16. The computer readable medium of claim 15, a first expert system of the plurality of expert systems comprising:
   a region growing element that locates an object within a first region of the plurality of regions and determines an intersection of the object with the ground plane; and
   a distance calculation element that determines a distance of the object from the vehicle according to the vertical position of the determined intersection within the image.

* * * * *